United States Patent
Kemkemian et al.

[11] Patent Number: 5,955,985
[45] Date of Patent: Sep. 21, 1999

[54] DEVICE FOR THE REDUCTION OF NOISE IN A RADAR RECEIVER

[75] Inventors: Stéphane Kemkemian, Paris; Philippe Lacomme, Igny, both of France

[73] Assignee: Thomson-CSF, Paris, France

[21] Appl. No.: 09/028,641

[22] Filed: Feb. 24, 1998

[30] Foreign Application Priority Data

Mar. 4, 1997 [FR] France ................................. 97 02547

[51] Int. Cl.⁶ .................................................. G01S 7/292
[52] U.S. Cl. .......................... 342/159; 342/70; 342/89; 342/109; 342/112
[58] Field of Search .................. 342/159, 70, 89, 342/109, 73, 91, 93, 112, 116, 198

[56] References Cited

U.S. PATENT DOCUMENTS

| | | | |
|---|---|---|---|
| 3,750,171 | 7/1973 | Faris | 342/112 |
| 3,797,017 | 3/1974 | Taylor, Jr. | 342/162 |
| 3,943,514 | 3/1976 | Afendykiw et al. | 342/156 |
| 4,075,555 | 2/1978 | Wight et al. | 324/644 |
| 4,297,703 | 10/1981 | Lacomme | 342/95 |
| 4,299,484 | 11/1981 | Holzapfel | 356/5.1 |
| 4,331,958 | 5/1982 | Lacomme | 342/152 |
| 4,727,375 | 2/1988 | Lacomme | 342/91 |
| 5,134,411 | 7/1992 | Adler | 342/130 |
| 5,661,485 | 8/1997 | Manuel | 342/13 |

FOREIGN PATENT DOCUMENTS 0 185 585 A1  6/1986  European Pat. Off. .
WO 95/04943  2/1995  WIPO .

*Primary Examiner*—John B. Sotomayor
*Attorney, Agent, or Firm*—Oblon, Spivak, McClelland, Maier & Neustadt, P.C.

[57] ABSTRACT

Disclosed is a device for the reduction of noise in a radar receiver. The noise to be reduced being governed by a $1/F^k$ relationship and the radar carrying out an encoding of the transmission in at least two frequencies, the device comprises at least the following means: firstly, means for routing the signals received to at least two channels so that, when a target is illuminated by a transmission at the first code frequency ($F_1$), the corresponding received signal ($S_1$) is sampled and routed to a first channel and then, when the target is illuminated by the second code frequency ($F_2$), the corresponding received signal ($S_2$) is sampled and routed to a second channel; and secondly, means for the linear combination of the signal ($S_1$) present in the first channel and the signal ($S_2$) present in the second channel, the linear combination synthesizing a filtering of the noise.

9 Claims, 7 Drawing Sheets

– 1 –

DEVICE FOR THE REDUCTION OF NOISE IN A RADAR RECEIVER

BACKGROUND OF THE INVENTION

The present invention relates to a device for the reduction of noise in a radar receiver. It can be applied especially to radars fitted into automobiles. More generally, it can apply to radars requiring low-cost manufacture while at the same time having high performance characteristics in regard to noise.

There are many types of architectures of radar reception circuits. Heterodyne receivers are known to provide great sensitivity but have a high cost price. This is incompatible with low-cost applications such as for example radars fitted into automobiles. In the latter case, the goal of reduced cost is all the more crucial as it is being planned to equip medium-budget vehicles with radars especially for road traffic regulation and control applications. Radars of this kind for example have the function of detecting the distance between and relative speeds of a carrier vehicle and a vehicle in front of it in order to enable the carrier vehicle to adjust its speed with respect to the preceding vehicle, in particular in order to comply with safety criteria.

The advantage of a homodyne receiver is that it can be produced at low cost especially because of its simplicity. In view of this advantage, plans are being made to use it especially for automobile applications. However, it has low sensitivity. Indeed, the target signal is directly transposed into baseband, namely into the very low frequencies, without particular amplification, and often without any amplification whatsoever. Now, components such as mixers or video frequency amplifiers for example are affected by a high level of colored additive noise whose spectral density varies according to a $1/F^k$ relationship, with F representing a frequency related to the transmitted carrier wave.

A homodyne receiver is furthermore subjected to other types of noises. These noises may be for example wideband white thermal noise coming from the antenna, the microwave mixer or amplifiers inserted between the antenna and the mixer. They may also be phase and amplitude noises from the wave generator carried by the targets or noises caused by insulation defects in the microwave circuits.

SUMMARY OF THE INVENTION

The invention is aimed especially at enabling the use of a homodyne receiver architecture while, at the same times obtaining sensitivity comparable to that which could have been had by providing the radar with a heterodyne receiver. To this end, an object of the invention is a device for the reduction of noise in a radar receiver wherein, with the noise to be reduced being governed by a $1/F^k$ relationship and with the radar carrying out an encoding of the transmission in at least two frequencies, said device comprises at least:

means for routing the signals received to at least two channels so that, when a target is illuminated by a transmission at the first code frequency, the corresponding received signal is sampled and routed to a first channel and then, when the target is illuminated by the second code frequency, the corresponding received signal is sampled and routed to a second channel;

means for the linear combination of the signal present in the first channel and the signal present in the second channel, the linear combination synthesizing a filtering of the noise.

The main advantages of the invention are that it improves the signal-to-noise ratio of a homodyne receiver and is simpler to implement and economical.

BRIEF DESCRIPTION OF THE DRAWINGS

Other features and advantages of the invention shall appear from the following description made with reference to the appended drawings, of which.

MORE DETAILED DESCRIPTION

Figure 1:
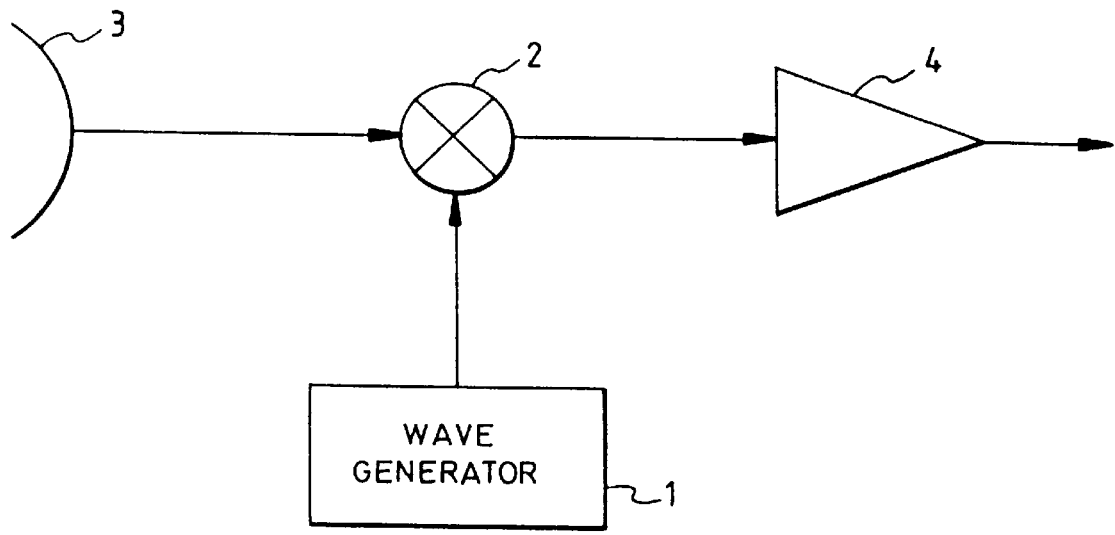
FIG. 1 is a block diagram of a homodyne radar receiver.

FIG. 1 is a block diagram of a homodyne radar receiver. The same wave generator 1 gives the transmission signal and is used as a local oscillator at reception. The transmission signal may possibly be pulse modulated. Only the part used for reception is shown in FIG. 1. The output of the wave generator 1, which herein acts as a local oscillator, is connected to one of the two inputs of a microwave mixer 2, the other input of this microwave oscillator 2 receiving the antenna signal 3. The output of the mixer 2 is connected to the input of a video frequency amplifier 4 which delivers a signal to a detector. The noise detected at the detector results from the contribution of:

the wideband additive white thermal noise coming from the antenna 3, the microwave mixer 2 and a possible microwave amplifier inserted between the antenna 3 and the mixer 2;

the phase and amplitude noise of the wave generator 1 borne by the signal received from the targets and/or noises caused by insulation defects in the microwave circuits;

the additive colored noise, governed by a $1/F^k$ relationship, coming from the video frequency port of the mixer and the video frequency amplifiers placed thereafter.

Figure 2:
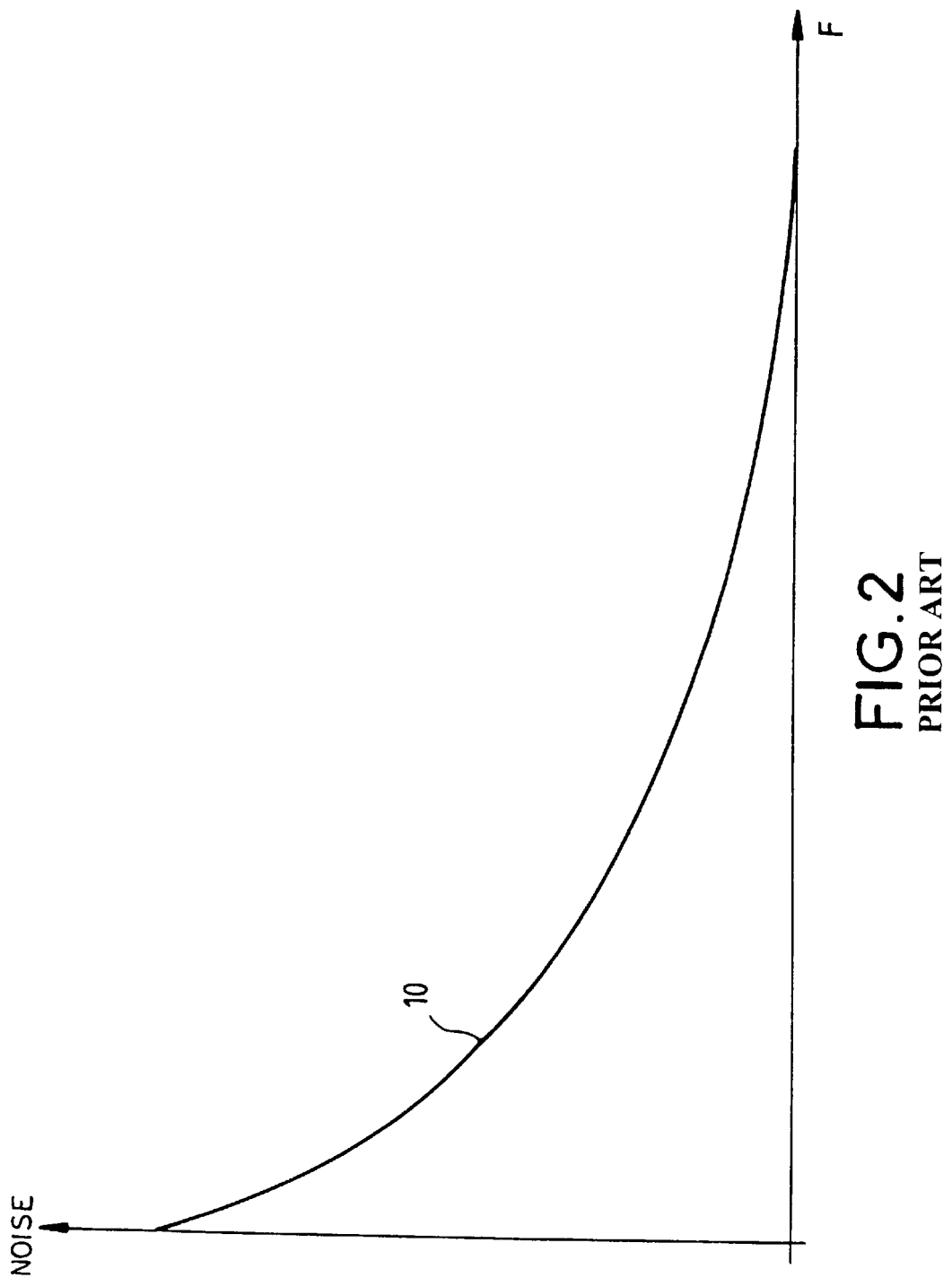
FIG. 2 exemplifies colored noise governed by a $1/F^k$ relationship.

As seen here above, the invention is aimed in particular at reducing the last-mentioned noise. FIG. 2 shows a curve 10 representing the colored noise according to a $1/F^k$ relationship, the X-axis representing the frequencies F and the Y-axis representing the amplitude of the noise. The noise shown for example is that of the microwave mixer 2.

Figure 3:
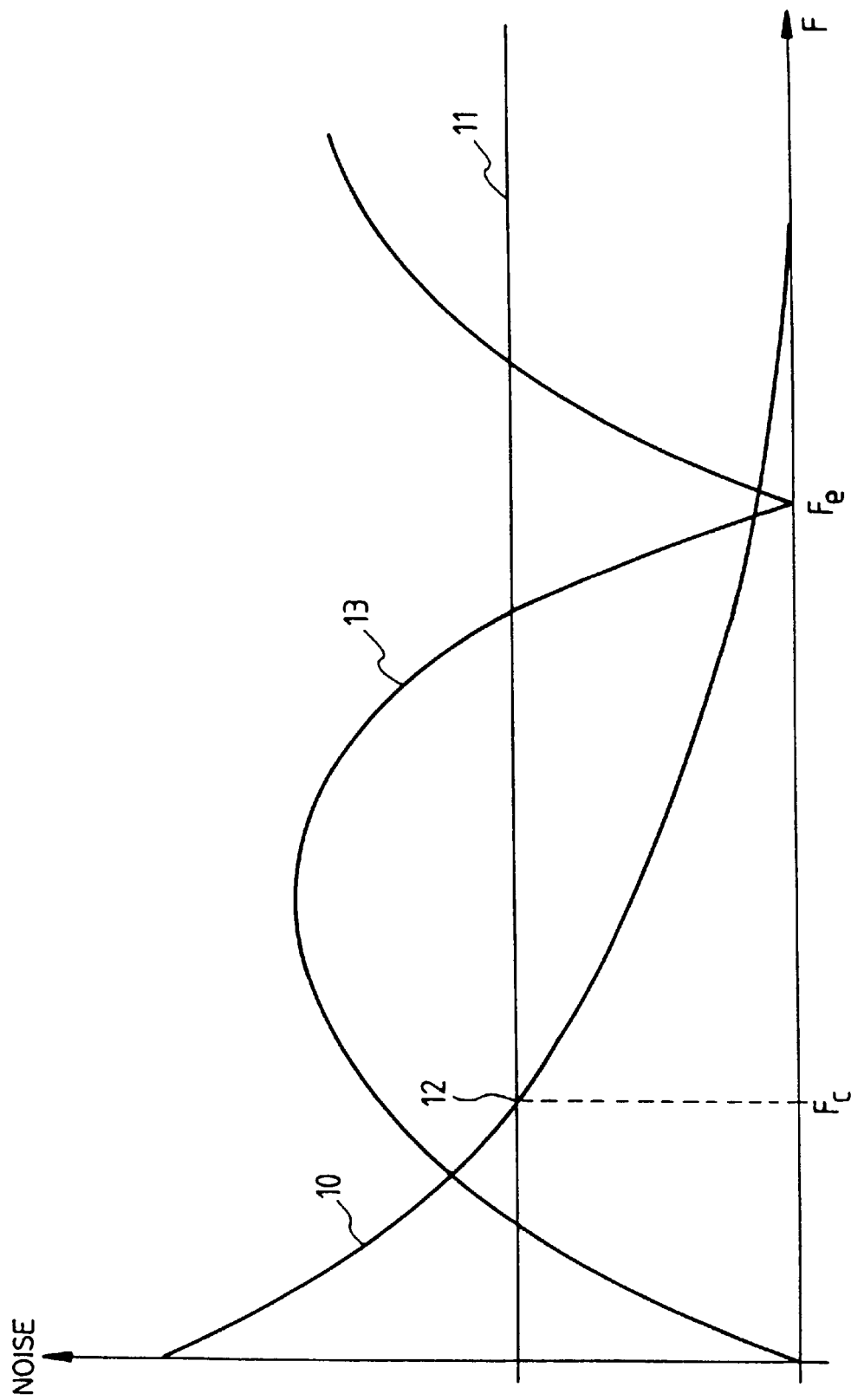
FIG. 3 illustrates the principle of operation of a device according to the invention.

FIG. 3 illustrates the principle of operation of a device according to the invention. In addition to the curve 10 representing colored noise, the thermal noise is represented by a straight line 11 parallel to the axis of the frequency. This noise is the normal noise below which it is not possible to go. This straight line 11 intersects for example the curve 10 representing the colored noise at a frequency equal to about 1 kHz. Beyond this frequency, the colored noise goes below the thermal noise. Therefore, it is for frequencies located below the frequency Fc, corresponding to the point of intersection 12 between the curve and the straight line, that the colored noise must be diminished. The invention uses the fact that the radar furthermore codifies the frequency transmitted in at least two alternative frequencies to synthesize a filtering of the colored noise in a simple and economical manner. An example of an amplitude transfer function is represented by a curve 13 in sine modulus having a zero at the zero frequency and a zero at the frequency Fe for sampling the received signals this frequency being furthermore equal for example to twice the rate of switching Fr of the frequency transmitted.

Figure 4:
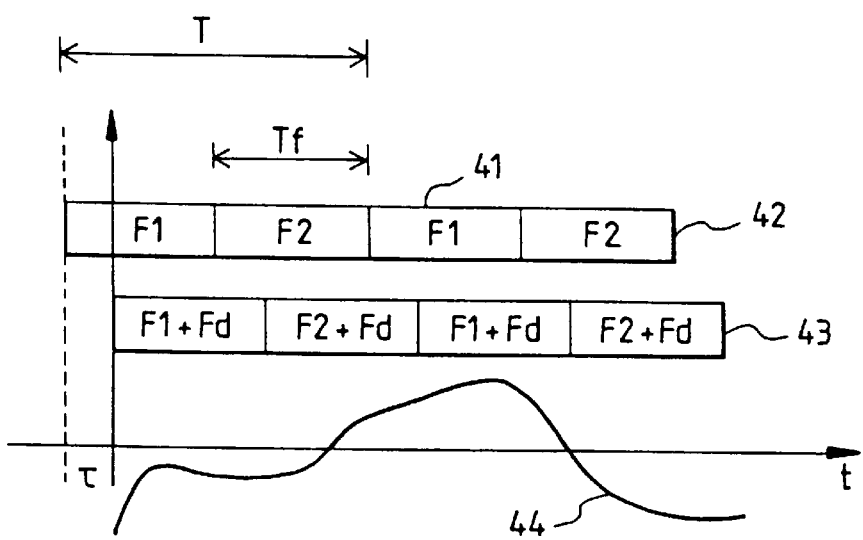
FIG. 4 exemplifies the frequency coding of a radar transmission.

FIG. 4 illustrates an exemplary encoding of the signals transmitted by the radar in a simple case where the number of encoding intervals 41 is equal to two. Each time interval 41 is equal to a given period of time Tf. The encoding is such that the radar sends out a sequence 42 comprising successively a signal at a first frequency $F_1$ during Tf and then a signal at a second frequency $F_2$ during this same duration Tf and so on and so forth. The rate of switching Fr between the frequencies transmitted is therefore equal to 1/Tf. The part 43 of the received signal coming from a target is obtained by giving the transmitted sequence F2 a time lag equal to the to-and-fro propagation time τ=2D/C and by transposing its instantaneous frequency by the Doppler frequency $$F_d = 2Vr/\lambda$$

due to the motion of the target D, C, Vr and λ representing respectively the distance to the target, the velocity of light, the speed of the target and the wavelength of the transmitted signal. Since the frequencies transmitted are close to one another, the wavelength λ varies little from one signal to another and the Doppler frequency may be considered to be constant with respect to the spectral resolution. A curve 44 provides a representation, juxtaposed with the sequences 42, 43 of transmitted and received signals, of the noise for example from the microwave mixer. This noise in particular comprises wideband white thermal noise represented by the straight line 11 and colored noise represented by the curve 11 which the invention is aimed, in particular, at reducing.

Figure 5:
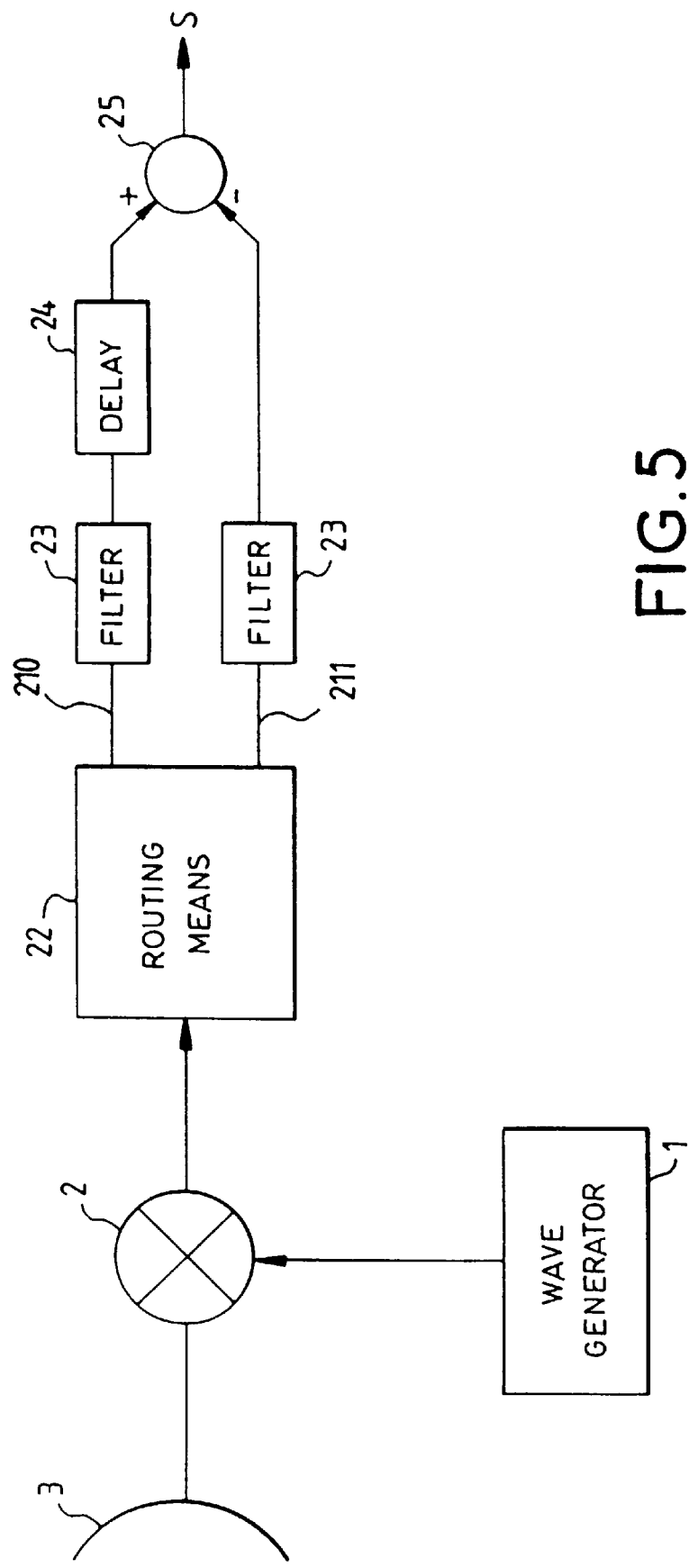
FIG. 5 shows a possible exemplary embodiment of a device according to the invention.

FIG. 5 illustrates an possible exemplary embodiment of a device according to the invention that is advantageously very simple to implement and is economical. At transmission, the signals delivered by the wave generator 1 are sent to the antenna 3 through amplification circuits that are not shown. At reception, the signals received by the antenna 3 are directed to the mixer 2 by circuits that are not shown. The mixer 2 receives firstly the signals signed by the frequency code and sent back by the targets and secondly the signal delivered by the wave generator 1 which works at reception like a local oscillator. The output of the mixer 2 is connected to the input of the routing means 22. These means sample and then route the signals given by the mixer on two channels 210, 211 in such a way that, when a target is illuminated by transmission at the first frequency $F_1$, the corresponding signal received $S_1$ is sampled and routed to a first channel 210 and then, when the target is illuminated at the second frequency $F_2$, the corresponding received signal $S_2$ is sampled and routed on a second channel 211. The routing means 22 comprise for example a demultiplexer known to those skilled in the art. These means, especially the sampling instants, are for example synchronized with the means for encoding the transmission signal. These means are not shown. Each channel comprises for example a particular frequency filtering device 23, for example a bank of Doppler filters, especially to detect the speed of a target. At least one channel 210 comprises furthermore a delay line type device 24 so as to compensate for:

the non-simultaneity of the instants at which the signals pertaining to the N frequencies of the code are taken into account;

the differential delays that may be introduced by filters proper to each channel.

The delay means 24 are for example delay line type devices. The channels 210, 211 are connected to subtraction means 25. These subtraction means subtract the signal of one channel from the signal of the other channel. For example, they subtract the output signal from the filter 23 of the second channel 211 from the output signal of the delay means 24 of the first channel 210. The signal S obtained at output of the subtraction means 25 is affected by a reduced level of colored noise. This is shown here below.

In a case of two-frequency encoding as illustrated in FIG. 4, the routing means 22 take two samples of a target signal after the beat coming from the mixer 2:

the first sample $S_1$ in a time interval where the frequency signal $F_1+F_d$ beats with the local oscillator signal at the first frequency $F_1$, the local oscillator function being carried out for example by the wave generator 1;

the second sample $S_2$ in an interval where the frequency signal $F_2+F_d$ beats with the local oscillator signal at the second frequency $F_2$;

these two samples being separated by a time period Tf, Tf being the duration of an interval;

the signal S at output of the subtraction, means 25 being given by the following relationship:

$$S = S_1 - S_2 \qquad (1);$$

In the case of a signal added independently of the frequency code, which is the case with thermal noise or colored noise induced by the mixer, the relationship (1) constitutes a filter whose frequency transfer function H(f) is given by the following relationship, f being the frequency variable and T being the period of sampling of the signals on each channel. T=2Tf in the two-channel example:

$$H(f) = -2je^{j(\pi fT)}\sin(\pi fT) \qquad (2)$$

The module of this transfer function is then given by the modulus of the function 2sin(πfT).

The curve representing a transfer function of this kind is of the type resembling the curve 13 of FIG. 3 with a zero for a zero frequency and another zero for a frequency equal to the frequency Fe=1/T of the sampling of the signals on each channel 210, 211. This sampling frequency is equal in the example to half of the switching frequency Fr=2/T of the transmitted frequency. It is actually D times smaller than the switching frequency if there are N encoding frequencies and N corresponding channels.

For a radar which, for example, is fitted into an automobile, the sampling frequency Fe in the case of a two-frequency encoding is for example in the range of 100 kHz. As seen here above, the colored noise 10 needs to be reduced only on a frequency band ranging from zero to an intersection frequency Fc of about 1 kHz this frequency band and, in any case, appreciably below the sampling frequency. The curves of colored noise 10 of the transfer function H(f) show that, within the intersection frequency Fc, the transfer function H(t), which is far from its maximum attenuates the colored noise.

Figure 6:
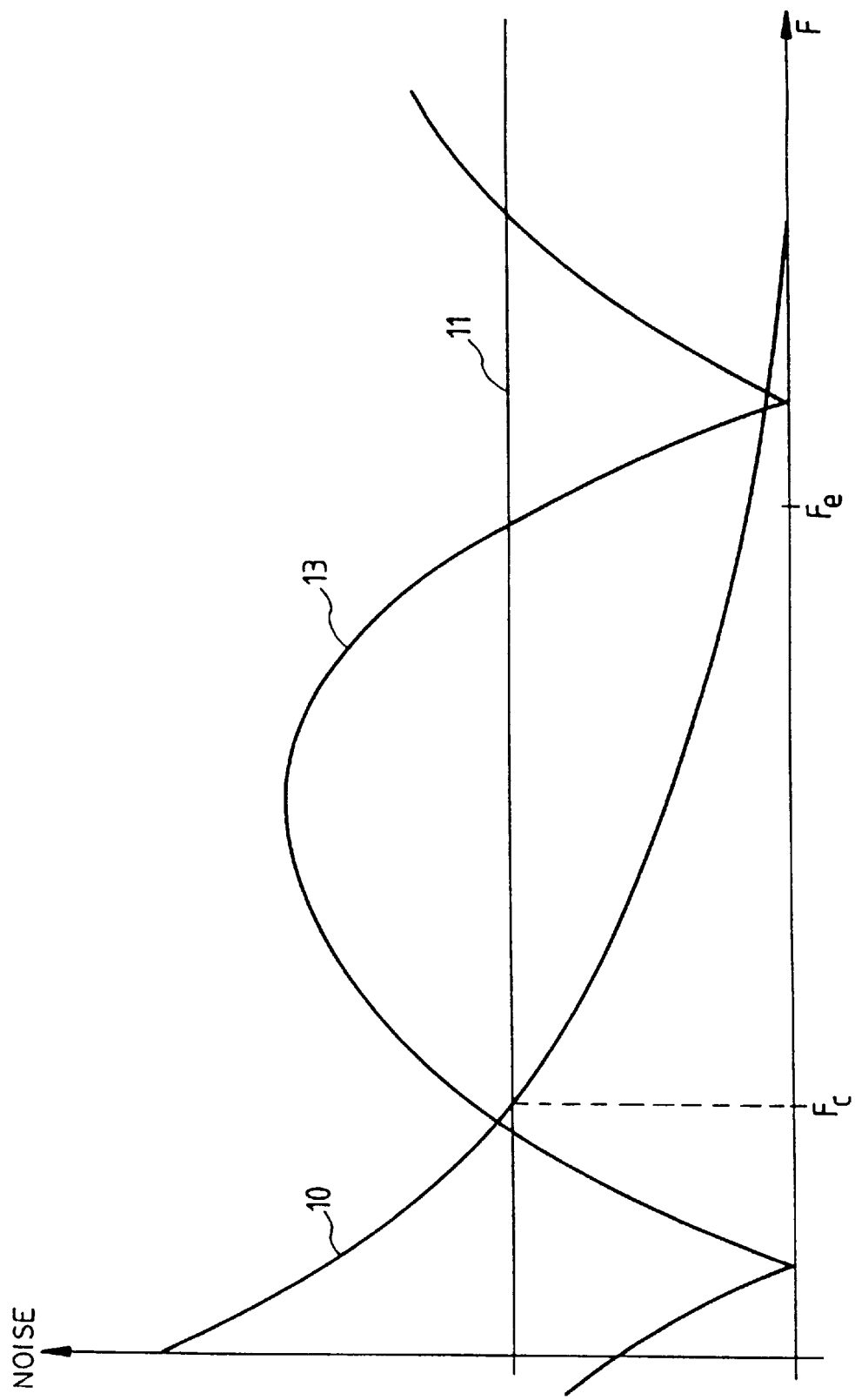
FIG. 6 exemplifies a frequency shift of a transfer function of a device according to the invention.
Figure 7:
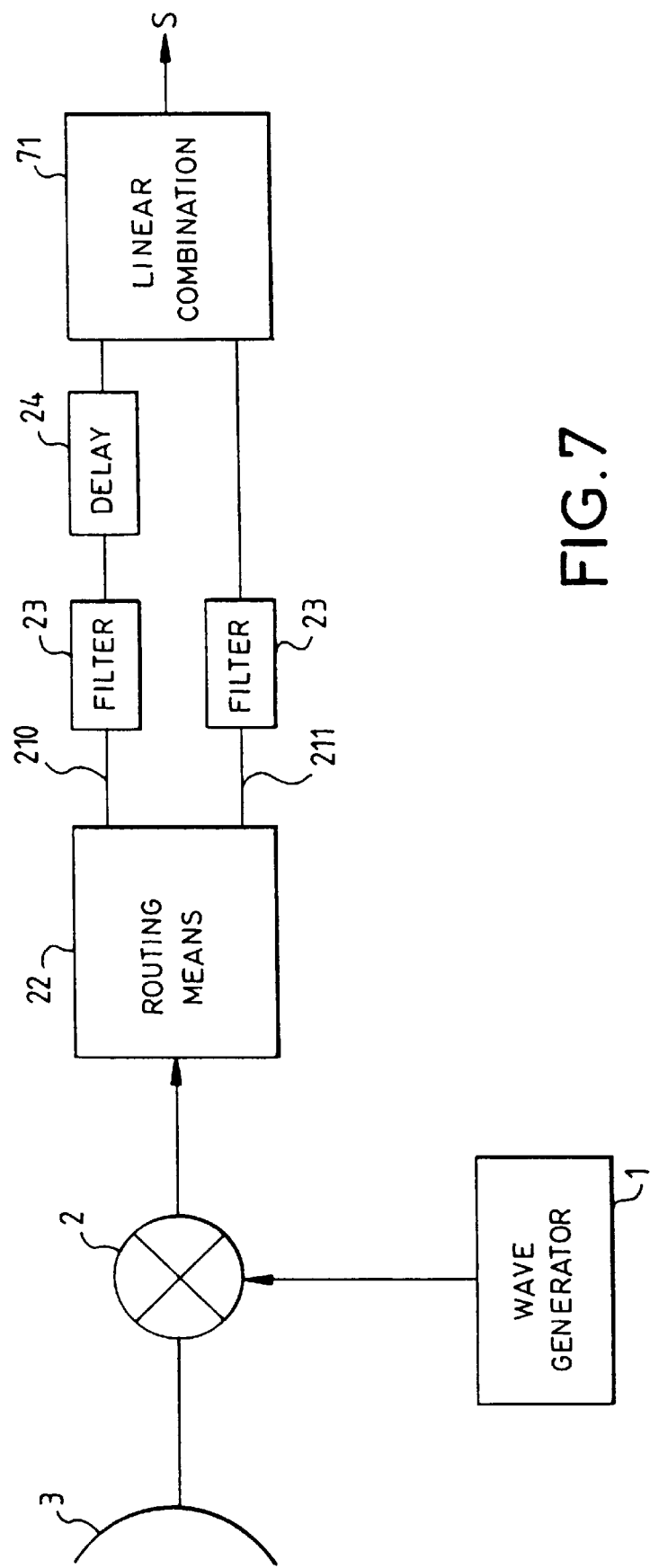
FIGS. 7 and 8 show other possible exemplary embodiments of a device according to the invention.

Should it be the case that the frequency Fc below which the colored noise is significant is not sufficiently lower than the sampling frequency Fe for the transfer function H(f) to attenuate this noise, then it is possible for example to shift the transfer function curve 13 towards the increasing frequencies as shown in FIG. 6, i.e., in fact by shifting the zeros of the transfer function of the filter. For this purpose, as can be seen in FIG. 7, the subtraction means 25 may be replaced by linear combination means 71 which carry out the following combination on the signals $S_1$ and $S_2$ of the channels 210, 211, S being the output signal at output of the linear combination means 71:

$$S = S_1 - WS_2 \quad (4)$$

where W is a complex number with a modulus equal to 1 and with a phase $\Psi$ close to 0, giving:

$$W = e^{j\Psi} \quad (5)$$

The transfer function H(f) can b written as follows:

$$H(f) = -2je^{j(\frac{\Psi}{2} + \pi fT)} \sin\left(\frac{\Psi}{2} + \pi fT\right) \quad (6)$$

and its modulus verifies the following relationship:

$$\|H(f)\|^2 = 4\sin^2\left(\frac{\Psi}{2} + \pi fT\right) \quad (7)$$

$\Psi/2$ giving rise to the frequency shift of the transfer function of $$\frac{\Psi}{4\pi T}.$$

The last-named approach however is less economical than the first one for the linear combination is slightly more complicated to implement and especially because it requires an SSB (single sideband) type mixer capable of reconstituting the beat signal in its complex expression. A mixer of this kind is expensive.

Figure 8:
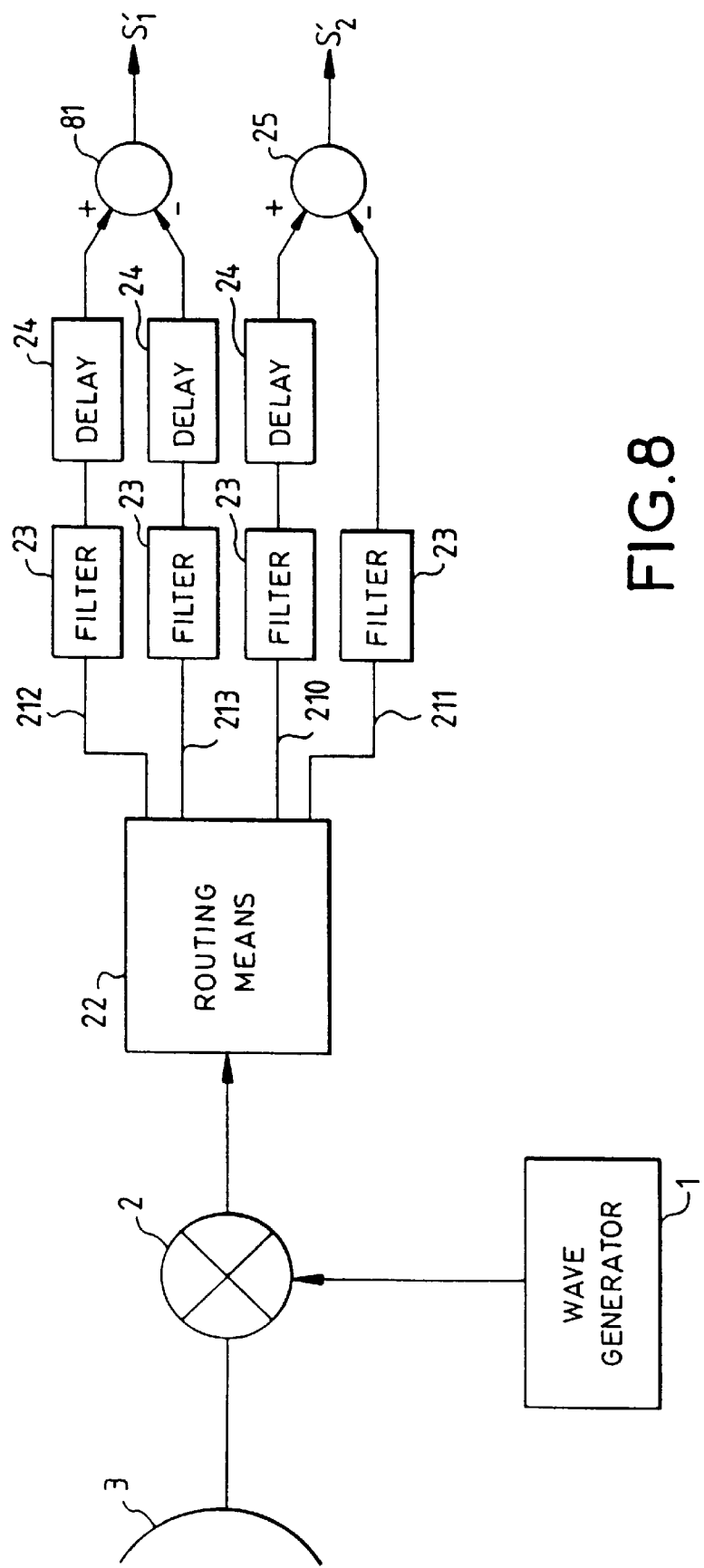

FIG. 8 shows another possible embodiment of a device according to the invention. In this cases since the transmission is encoded on four frequencies, the device according to the invention has four channels 210, 211, 212, 213 each associated with an encoding frequency. The channels are brought together in sets of two so that the first subtraction means 25 deduct the signal of the second channel 211 from the signal of the first channel 210 and so that the second subtraction means 81 deduct the signal of the fourth channel 213 from the signal of the third channel 212. The signals S1' and S2' at output of the subtraction means 25, 81 are thus rid of colored noise governed by the relationship $1/F^k$ and can be used in a subsequent processing operation based on two detection signals. Indeed it may be very advantageous for this processing operation to be done on detection signals that are rid of colored noise. A processing operation of this kind may for example give the distance of the speed of the targets. Each channel 210, 211, 212, 213 comprises for example a filtering device, possibly a battery of Doppler filters. All the channels except one 211 comprise for example delay means 24 so as to compensate for the non-simultaneity of the instants at which account is taken of the signals pertaining to the four encoding signals and differential delays that might possibly be introduced by the filters proper to each channel.

The invention has been described with reference to exemplary embodiments based on two or four transmission code frequencies. However it may be applied whatever may be the number of code frequencies. All the linear combinations on the associated received signals synthesizing a noise filtering operation may be envisaged. Furthermore, in the exemplary embodiments described, the sampling is done by the routing means fore in practice, they generally perform a function of this kind. However it is possible to provide for a sampling of the signals at another place in the device according to the invention. In particular, the sampling may be done in the subtraction means.

We claim:

1. A device for the reduction of noise in a radar receiver wherein, with the noise to be reduced being governed by a $1/F^k$ relationship and with the radar carrying out an encoding of the transmission in at least two frequencies, said device comprises at least:

means for routing the signals received to at least two channels so that, when a target is illuminated by a transmission at the first code frequency ($F_1$), the corresponding received signal ($S_1$) is sampled and routed to a first channel and then, when the target is illuminated by the second code frequency ($F_2$), the corresponding received signal ($S_2$) is sampled and routed to a second channel;

means for the linear combination of the signal ($S_1$) present in the first channel and the signal ($S_2$) present in the second channel, the linear combination synthesizing a filtering of the noise.

2. A device according to claim 1, wherein the linear combination means perform a subtraction between the signal ($S_1$) of the second channel and the signal ($S_2$) of the first channel.

3. A device according to claim 1, wherein the routing means are connected to the output of a microwave mixer receiving, firstly, the signals sent back by the target and, secondly, the local oscillator signal.

4. A device according to claim 1, wherein each channel comprises a frequency filtering device.

5. A device according to claim 1, wherein each channel comprises a bank of Doppler filters.

6. A device according to claim 1, wherein all the channels except one comprise delay means.

7. A device according to claim 1, wherein the linear combination means carry out a subtraction between the signal ($S_1$) of the second channel multiplied by a value W and the signal ($S_2$) of the first channel, the value W being a complex number with a modulus equal to 1 and a phase equal to 0.

8. A device according to claim 1 wherein the radar, performing an encoding of the transmission in four frequencies, comprises four channels each associated with an encoding frequency, the channels being grouped two by two in such a way that first subtraction means deduct the signal of the second channel from the signal of the first channel and second subtraction means deduct the signal of the fourth channel from the signal of the third channel.

9. A device according to claim 1, wherein the receiver is a homodyne receiver.

* * * * *